United States Patent
Enomoto et al.

(10) Patent No.: US 7,592,734 B2
(45) Date of Patent: Sep. 22, 2009

(54) THREE-PHASE PERMANENT MAGNET BRUSHLESS MOTOR

(75) Inventors: Yuji Enomoto, Hitachi (JP); Akeshi Takahashi, Hitachi (JP); Motoya Ito, Hitachinaka (JP); Ryoso Masaki, Hitachi (JP); Katsuyuki Yamazaki, Chiba (JP); Masahide Yamazaki, Funabashi (JP); Masashi Kitamura, Mito (JP); Chio Ishihara, Tokyo (JP); Kazuo Asaka, Matsudo (JP); Shoji Ohiwa, Saitama (JP); Yasuaki Motegi, Sano (JP)

(73) Assignees: Hitachi Industrial Equipment System Co., Ltd., Tokyo (JP); Japan Servo Co., Ltd., Tokyo (JP); Hitachi Powered Metals Co., Ltd., Chiba-ken (JP)

( * ) Notice: Subject to any disclaimer, the term of this patent is extended or adjusted under 35 U.S.C. 154(b) by 250 days.

(21) Appl. No.: 11/505,295

(22) Filed: Aug. 17, 2006

(65) Prior Publication Data
US 2007/0046130 A1    Mar. 1, 2007

(30) Foreign Application Priority Data
Aug. 31, 2005    (JP)    ............................. 2005-251360

(51) Int. Cl.
*H02K 1/12* (2006.01)
(52) U.S. Cl. .......................... 310/254; 310/261; 310/44
(58) Field of Classification Search .................. 310/44, 310/216, 254, 258, 261, 156.01
See application file for complete search history.

(56) References Cited

U.S. PATENT DOCUMENTS

| | | | |
|---|---|---|---|
| 5,291,357 A * | 3/1994 | Uda | 360/99.08 |
| 6,335,582 B1 * | 1/2002 | Abukawa et al. | 310/214 |
| 6,703,753 B1 * | 3/2004 | Fujinaka | 310/216 |
| 6,747,386 B2 * | 6/2004 | Fujinaka | 310/216 |
| 6,776,590 B2 * | 8/2004 | Cooper et al. | 417/423.7 |
| 2003/0160674 A1 | 8/2003 | Komuro | |
| 2005/0174004 A1 * | 8/2005 | Takehara et al. | 310/156.43 |
| 2006/0082241 A1 * | 4/2006 | Enomoto et al. | 310/216 |

FOREIGN PATENT DOCUMENTS

| | | |
|---|---|---|
| CN | 1441445 | 9/2003 |
| CN | 1527458 | 9/2004 |
| JP | 09-172762 | 6/1997 |
| JP | 10-243621 | 9/1998 |
| JP | 2004-274807 | 9/2004 |

* cited by examiner

Primary Examiner—Thanh Lam
(74) Attorney, Agent, or Firm—Antonelli, Terry, Stout & Kraus, LLP.

(57) ABSTRACT

A three-phase permanent magnet brushless motor comprises a stator having three-phase windings, and a rotor having a permanent magnet with a plurality of poles for serving as a field magnet. The stator comprises a stator core which includes a powder core that is compacted at a high density in at least teeth thereof. A combination of the number of magnetic poles of the rotor with the number of slots of the stator satisfies a condition that a least common multiple of the number of slots and the number of magnetic poles is 60 or more in a region in which the number of magnetic poles is 16 or less, and the number of slots is 12 or less. The powder core is made by compacting magnetic powders to have a green density of 7.5 g/cm$^3$ or higher.

4 Claims, 4 Drawing Sheets

FIG. 1A
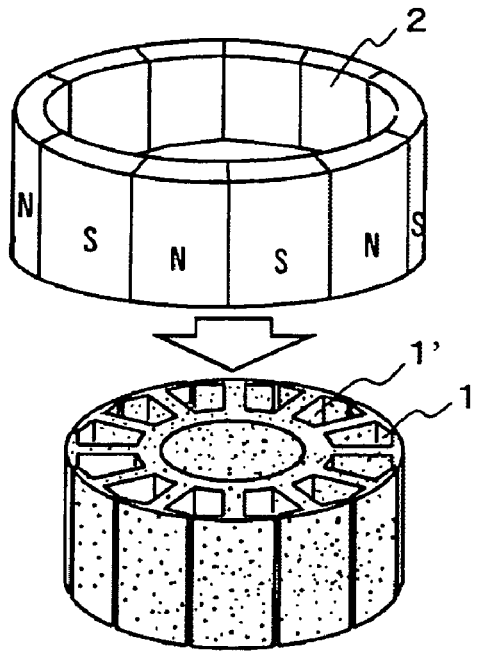
FIG. 1B
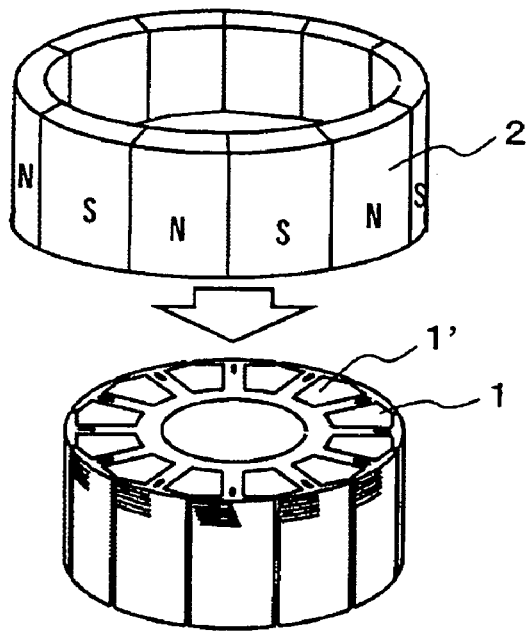
FIG. 2
| | | NUMBER OF SLOTS OF STATOR CORE | | | |
|---|---|---|---|---|---|
| | | 3 | 6 | 9 | 12 |
| NUMBER OF POLES OF PERMANENT MAGNET | 2 | △ : 6 | | | |
| | 4 | □ : 12 | △ : 12 | | |
| | 6 | | × | △ : 18 | |
| | 8 | | □ : 24 | ○ : 72 | △ : 24 |
| | 10 | | | × | ○ : 60 |
| | 12 | | | □ : 36 | × |
| | 14 | | | | ○ : 84 |
| | 16 | | | | □ : 48 |

MODELING OF DIMENSIONAL ERROR

AMOUNT OF PROTRUSION: 30 μm

FEM ANALYSIS MESH

RESULT OF COGGING TORQUE FEM CALCULATION

MODELING OF MAGNETIC PROPERTY

BH CURVE

FEM ANALYSIS MODEL

RESULT OF COGGING TORQUE FEM CALCULATION

THREE-PHASE PERMANENT MAGNET BRUSHLESS MOTOR

BACKGROUND OF THE INVENTION

The present invention relates to a three-phase permanent magnet brushless motor, and more particularly, to the structure of a reduced cogging torque powder core permanent magnet motor which is less affected by variations associated with manufacturing.

Permanent magnet brushless motors are used to drive machines for converting electric energy to mechanical power in industrial, home-electric, and automobile applications. Since importance is placed on a reduction in size of motors in addition to an improved efficiency, the reduction in size has been accomplished by an increase in density of coils in a stator core, resulting from the employment of high energy product magnets containing rare earth materials, a core division manufacturing method, and the like.

However, since the permanent magnet brushless motor has a high energy product of the magnet, a pulsatile torque called a "cogging torque" is generated due to a relationship between the number of poles of the magnet and the number of slots of the stator core. For this reason, induction motors, which do not use magnets, and coreless motors are substituted for the permanent magnet brushless motor in some cases. These motors, though generating smaller cogging torques, are inferior in energy conversion efficiency to motors based on permanent magnets. Therefore, a need exists for reducing the cogging torque of the permanent magnet motor.

A known method of reducing a cogging torque of a permanent magnet motor involves using a combination of a magnet with a stator in such a relationship to increase a least common multiple of the number of poles of the magnet and the number of slots of the stator, as shown in Japanese Patents Nos. 2954552 and 2743918. This method, when used, can reduce the period and amplitude of the cogging torque.

However, in a motor which relies on the use of a high energy product magnet to reduce the size and improve the efficiency, even if a motor is optimally designed using the combination of the number of poles with the number of slots as shown Japanese Patents Nos. 2954552 and 2743918, a lower dimensional accuracy caused by variations associated with the manufacturing can result in an increase in cogging torque.

Generally, for manufacturing a motor, a stator core is made by stamping silicon steel plates and laminating the stamped plates. Further, for increasing the density of a stator coil, it is necessary to finely divide a stator core and reassemble the divided core fragments into the stator core. In this process, a stamping accuracy, a lamination accuracy, a division/reassembly accuracy, variations in properties of the silicon steel plates, a stress applied to the core, and the like cause variations, and the stator core varies in the inner diameter dimension, magnetic properties and the like due to the resulting combination of variations associated with the manufacturing. Such variations also vary depending on particular manufacturing conditions, so that there is no guarantee that products of the same performance can be provided every time.

In applications in which the cogging torque is preferably reduced to an extreme, and in applications which require motors in homogeneous specifications, variations in cogging torque due to such variations associated with the manufacturing are not welcome in many cases. Thus, a need exists for a permanent magnet brushless motor which is capable of restraining dimensional variations and variations in magnetic properties associated with the manufacturing to reduce the cogging torque.

SUMMARY OF THE INVENTION

In view of the problems of the prior art mentioned above, it is an object of the present invention to provide a three-phase permanent magnet brushless motor which is capable of restraining variations in dimensions and magnetic properties associated with the manufacturing to limit an increase in cogging torque caused by variations associated with the manufacturing.

To achieve the above object, the present invention provides a three-phase permanent magnet brushless motor which comprises a stator having three-phase windings, and a rotor having a permanent magnet with a plurality of poles for serving as a field magnet, wherein the stator comprises a stator core which includes a powder core that is compacted at a high density in at least teeth thereof, and a combination of the number of magnetic poles of the rotor with the number of slots of the stator satisfies a condition that a least common multiple of the number of slots and the number of magnetic poles is 60 or more in a region in which the number of magnetic poles is 16 or less, and the number of slots is 12 or less.

The powder core has a green density of 7.5 g/cm$^3$ or higher.

Also, the powder core is compacted with a density error equal to or less than 5% of a magnetization property in at least the teeth of the stator, and a dimensional error restrained to ⅟₂₀ or less as long as a gap.

The combination of the number of poles of the rotor with the number of slots of the stator results in 60 cycles or more of a main component of a cogging torque per rotation.

The three-phase permanent magnet brushless motor according to the present invention substantially eliminates variations in quality, can be reduced in size and improve the efficiency, and has a cogging torque reduction property. Accordingly, the motor can contribute to a reduced size, an improved efficiency, a better operability, an improved controllability and the like in applications such as automobile, home electronics, industrial driving system and the like when the motor is used in such applications.

Other objects, features and advantages of the invention will become apparent from the following description of the embodiments of the invention taken in conjunction with the accompanying drawings.

BRIEF DESCRIPTION OF THE DRAWINGS

FIG. 1A is a perspective view illustrating the structure of a motor according to one embodiment of the present invention;

FIG. 1B is a perspective view illustrating the structure of a conventional motor;

FIG. 2 is a table showing the relationship between a combination of the number of magnetic poles with the number of slots and a cogging torque;

DETAILED DESCRIPTION OF THE INVENTION

Figure 3A:
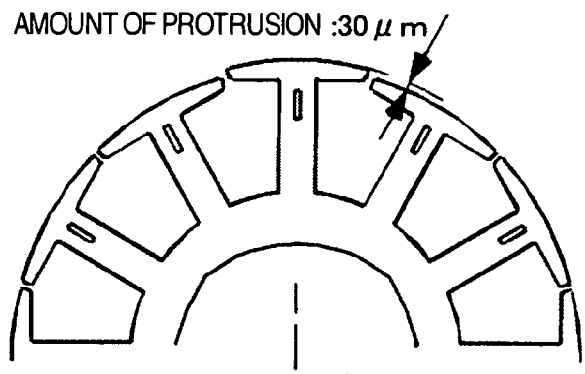
FIGS. 3A-3C are diagrams for describing the result of an analysis on a cogging torque when there is a dimensional error.

A three-phase permanent magnet brushless motor has a highly dense powder stator core and satisfies a relationship between the number of magnetic poles and the number of slots in which a cogging torque is reduced, with the intention to simultaneously achieve two contradictory objects of improving the efficiency and a cogging torque reduction performance, and reducing variations associated with the manufacturing.

Specifically, the stator core is constituted using a powder core, which is highly compacted, in the entire stator or at least teeth. The powder core is made by compacting electrically insulated iron powder such that its density is equal to or higher than 7.5 g/cm$^3$. As a result, errors in density are restrained to 5% or less in terms of the magnetization property in at least the teeth, and dimensional errors are restrained to $\frac{1}{20}$ or less as long as a gap.

Also, a combination of the number of magnetic poles of the rotor with the number of slots of the stator satisfies a condition that a least common multiple of the number of slots and the number of magnetic poles is 60 or more in a region in which the number of magnetic poles is 16 or less, and the number of slots is 12 or less. Combinations employed herein are eight magnetic poles of the rotor with nine slots of the stator; ten magnetic poles of the rotor with 12 slots of the stator; and 14 magnetic poles of the rotor with 12 slots of the stator.

A motor constructed as described above can simultaneously satisfy the aforementioned contradictory objects. In the following, one embodiment will be described with reference to the accompanying drawings.

FIG. 2 shows the relationship known from the aforementioned Japanese Patents Nos. 2954552 and 2743918 about the combination of the number of slots of a stator core with the number of magnetic poles of a rotor permanent magnet in a permanent magnet brushless motor. The vertical axis of the table represents the number of magnetic poles, the horizontal axis represents the number of slots, and values in the table represent least common multiples of the number of slots and the number of magnetic poles. Symbols in the table represents the magnitude of cogging torques, where ○ represents a combination which can most reduce the cogging torque; □ represents a combination which experiences an intermediate cogging torque; and Δ represents a combination which experiences a large cogging torque. X and blank represent combinations which are not available in three-phase motors.

This embodiment uses a powder core for the motor, and employs the following combinations in a region in which the small permanent magnet motor has 16 magnetic poles or less, and 12 slots or less. One combination comprises eight magnetic poles of the rotor and nine slots of the stator; another combination comprises ten magnetic poles of the rotor and 12 slots of the stator; and a further combination comprises 14 magnetic poles of the rotor and 12 slots of the stator. Using a powder core and employing these combinations can simultaneously satisfy the contradictory objects of improving a motor efficiency and a cogging torque reduction performance, and reducing variations associated with the manufacturing. The reason will be described below with reference to analytically investigated examples.

FIGS. 1A and 1B are perspective views each illustrating a three-phase permanent magnet brushless motor. FIG. 1A illustrates the structure of a motor which employs a powder core for a stator core in accordance with one embodiment of the present invention, and FIG. 1B illustrates the structure of a motor which is of the same type as the motor in FIG. 1A and has a stator core made of silicon steel plates.

The structure of the motor according to this embodiment comprises an integrally compacted stator core 1 using a powder core. A permanent magnetic rotor 2 has an annular shape, and is an outer rotor in this figure, which has ten magnetic poles.

The stator core 1 has 12 slots 1', and comprises a powder core produced by compacting electrically insulated iron powder. The overall stator is integrated and is not divided. The green density is 7.5 g/cm$^3$ or higher.

In this way, the highly densely compacted powder core exhibits good magnetic properties, and hardly generates eddy current loss because particles of iron powder are electrically insulated from each other. Also, since the core is compacted using a single die, the core can be highly accurately compacted in conformity to the die dimensions. Also, due to the elimination of treatments at high temperatures such as sintering, the dimensions can be maintained after the compacting as well, thus ensuring a high dimensional accuracy when it is used as a final part. For reference, in this embodiment, dimensional errors of the powder core can be restrained to $\frac{1}{20}$ or less as long as the gap. It is therefore possible to limit an increase in cogging torque due to errors in dimensional accuracy.

For purposes of comparison, a description will be given of an increase in cogging torque when a stator core is made of conventional silicon steel plates. FIG. 1B illustrates a motor which has a stator core 1 made by assembling silicon steel plates. This motor can experience (1) dimensional errors caused by a low stamping accuracy or occurring when stamped parts are laminated for assembly; (2) differences in magnetic properties depending on a direction in which steel plates are stamped; and (3) variations associated with the manufacturing due to local changes in magnetic properties depending on how stresses are applied to the plates during the stamping (a residual stress and the like).

The variations associated with the manufacturing, resulting from these causes, contribute to variations in magnetic flux density in gaps and a consequent increase in cogging torque. Essentially, in a design for reducing the cogging torque which is generated by a combination of the number of magnetic poles with the number of slots, the variations associated with the manufacturing appear as variations in cogging torque performance.

Figure 3B:
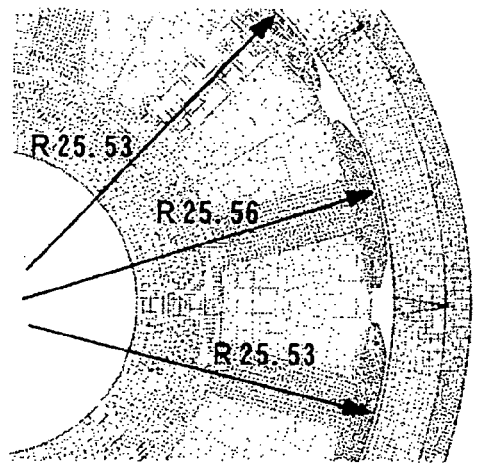
Figure 3C:
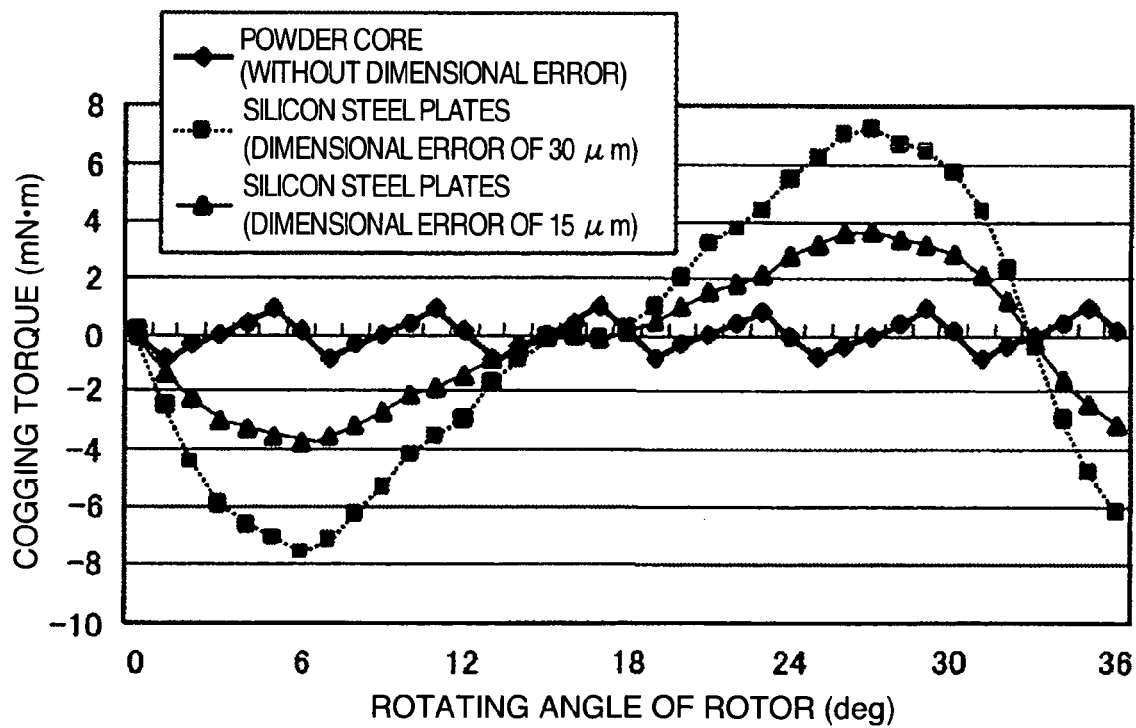

FIGS. 3A-3C show the result of a magnetic field analysis for examining the influence of the cogging torque when dimensional variations occur due to the cause (1). FIG. 3A shows a model when a dimensional error is taken into consideration, where the dimensional error was regarded as a protruding tooth of the core in the analysis. FIG. 3B shows an analytical model which has a combination of ten magnetic poles with 12 slots, by way of example.

Here, the cogging torque was analyzed for a motor which comprised a stator having a powder core (the roundness of which can be 0 μm for the inner diameter of the stator through integral compacting), and a core made by laminating stamped silicon steel plates with variations associated with the manufacturing, i.e., a tooth protruding by approximately 15 μm or 30 μm. It should be noted that the protrusion of the tooth by 30 μm is an error of approximately $\frac{1}{15}$ as long as the gap.

FIG. 3C shows the result of the analysis on the cogging torque, where the vertical axis represents the cogging torque, and the horizontal axis represents a rotor rotating angle. It can be confirmed that the cogging torque increases in amplitude approximately ten times larger in a core made of silicon steel plates which presents a low roundness (a dimensional error of 30 μm) than in a motor having a powder core (without dimensional errors).

Essentially, the cogging torque is generated a number of cycles per rotation, which is a least common multiple of the number of magnetic poles and the number of slots. Specifically, in the foregoing example which has 12 slots and 10 poles, 60 cycles of the cogging torque are generated in one rotation of the powder core motor, as can be seen from the result of the analysis. However, the cycle of the cogging torque generated due to variations associated with the manufacturing is the order of the number of poles of the rotor, so that ten cycles are included in one rotation. Therefore, when a stamping accuracy and an assembling accuracy imply problems, the cogging torque varies in proportion to such low accuracies. As can be understood from the foregoing result, the cogging torque can be largely reduced when the motor core is comprised of a powder core, and employs one of the aforementioned combinations of the number of slots with the number of poles.

Figure 4A:
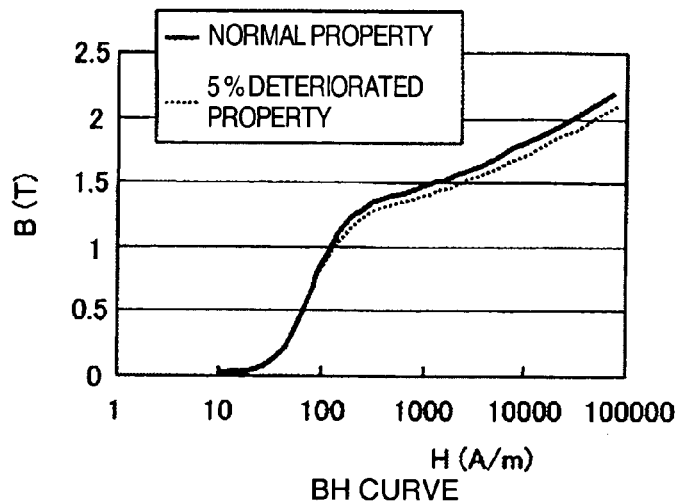
FIGS. 4A-4C are diagrams for describing the result of an analysis on a cogging torque when there are errors in magnetic property (permeability)
Figure 4B:
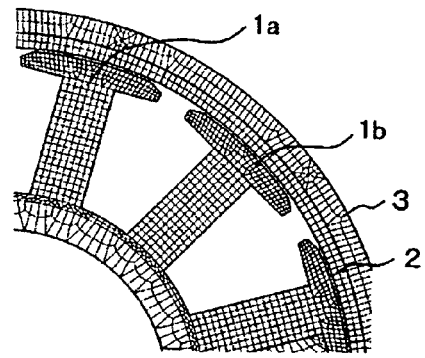
Figure 4C:
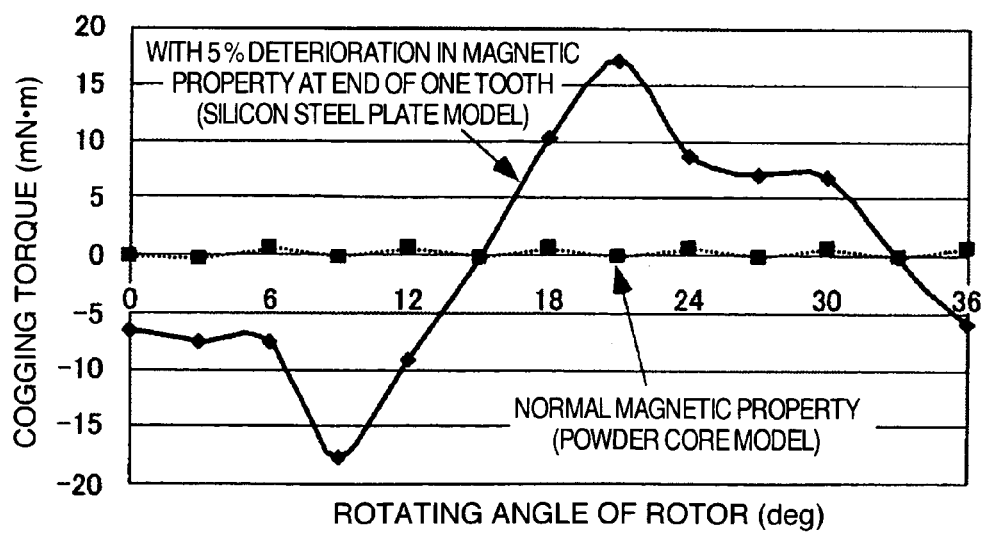

FIGS. 4A-4C show the result of an analysis when the permeability (magnetic property) varies in part of a stator core. This model is an example which employs a combination of ten poles with 12 slots. FIG. 4A shows a BH curve for a magnetic material (silicon steel plate) for models which exhibit the normal magnetic property and a deteriorated property by 5%. A magnetic field analysis was made using these magnetic property models to see how the cogging torque of the motor would be affected.

FIG. 4B shows a model of the magnetic field analysis. The analysis was made using a model which had dimensions of a stator core with a perfect accuracy, and a model which exhibited a deterioration of the magnetic property by 5% only in one portion at an end of a tooth (for example, 1a).

FIG. 4C shows the result of the analysis. The cogging torque is hardly generated when the magnetic property is normal (powder core model). However, if the permeability differs even in a very small portion at the end of a tooth (the core made by laminating stamped silicon steel plates), the cogging torque increases in amplitude approximately 20 times larger than that when the magnetic property is normal. In this event, the cogging torque is generated a number of cycles equal to the order of the number of poles of the rotor (ten cycles per rotation).

As described above, when the core is made by laminating stamped silicon steel plates, a residual stress can be generated at an end of a tooth or the like due to different influences exerted on the silicon steel plate core during stamping, resulting in variations in the magnetic property (permeability) and a consequent increase in variations in the cogging torque. In contrast, the powder core of this embodiment can be manufactured through integral compacting at a high compacting pressure with constantly isotropic and homogeneous magnetic properties, so that the resulting motor generates a reduced cogging torque which is equivalent to a design value.

Figure 5A:
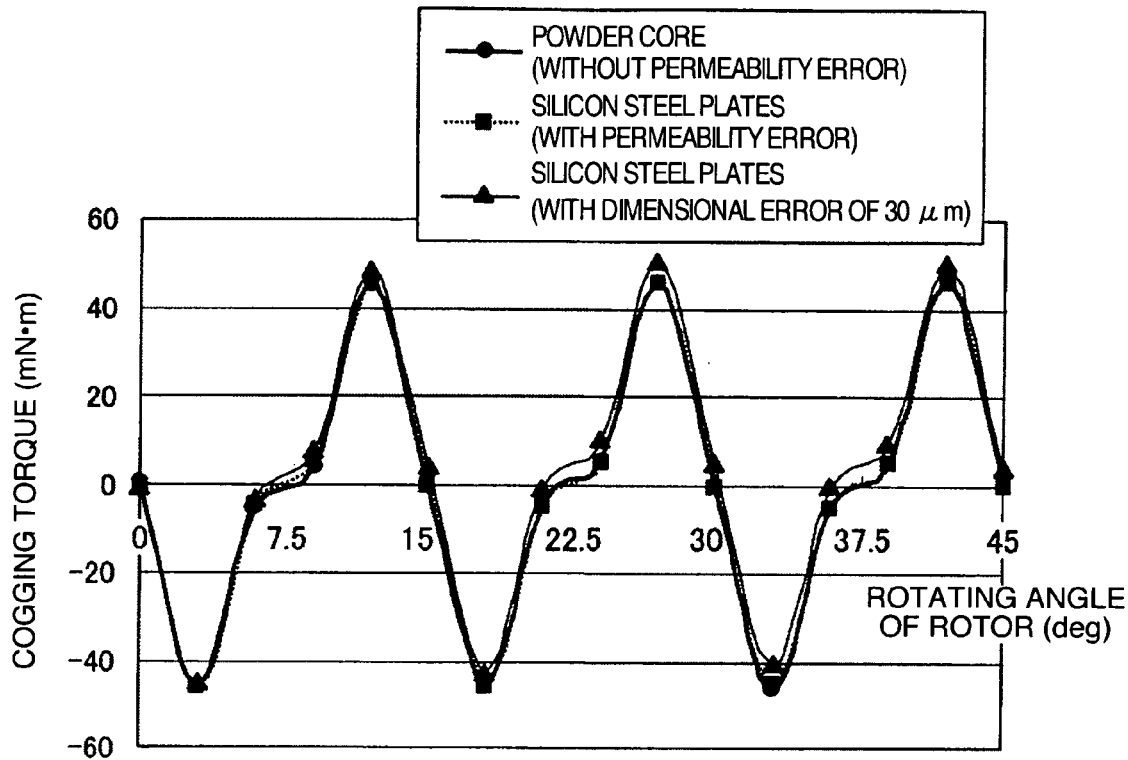
FIGS. 5A and 5B are graphs each showing a relationship between a combination of the number of magnetic poles with the number of slots and a cogging torque.
Figure 5B:
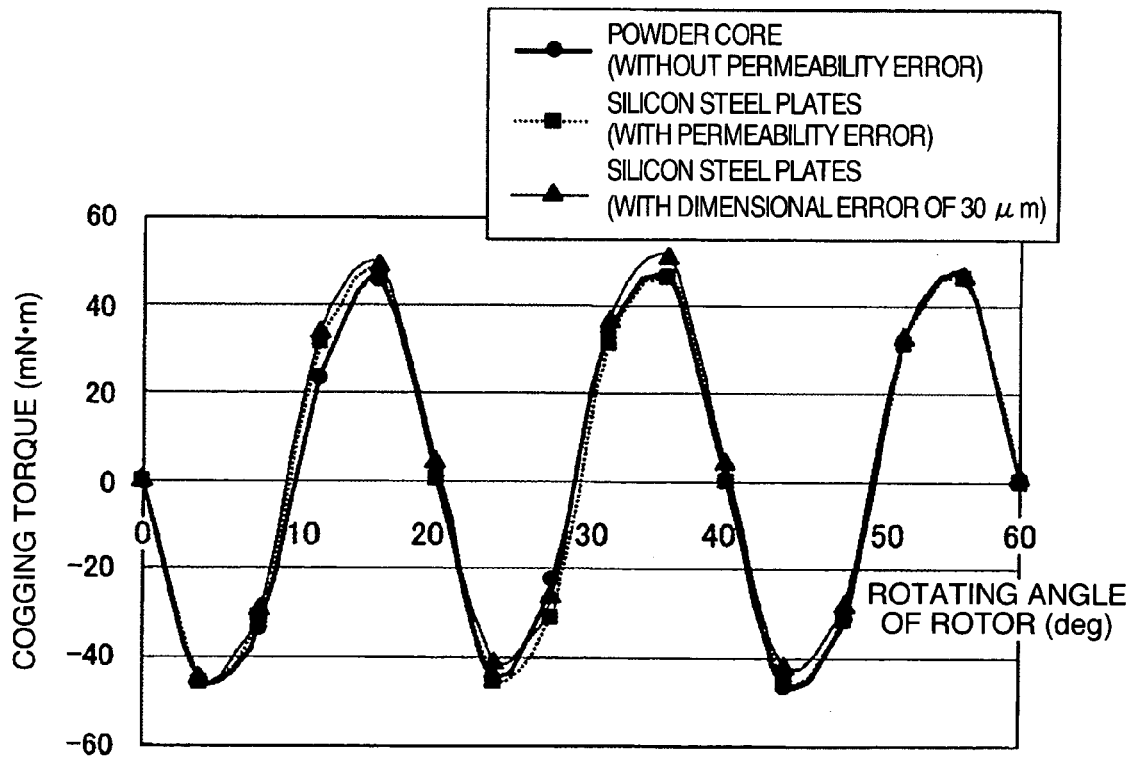

Next, a description will be given of the relationship between the combination of the number of magnetic poles with the number of slots and the cogging torque. FIGS. 5A and 5B show the cogging torque property with different combinations of the number of poles with the number of slots, showing the result of an analysis on cogging torques generated from combinations of the number of poles with the number of slots, different from those suggested in the present invention.

FIG. 5A shows the result of calculations for three conditions, where a powder core was used (without permeability errors), a core was made of silicon steel plates (with a permeability error), and a core was made of silicon steel plates (with a dimensional error of 30 μm), with a combination of eight poles with 12 slots. FIG. 5B shows the result of calculations for the same three conditions as those in FIG. 5A with a combination of six poles with nine slots. Motors were made in the same constitution through an equivalent design such that the magnetic flux density was substantially equal in teeth.

As shown in FIG. 5A, the cogging torque associated with the combination of eight poles with 12 slots hardly varies in amplitude irrespective of the presence of a dimensional error in teeth, the absence of an error in permeability, and the absence of an error in permeability and dimension (powder core). Also, the cogging torque has the amplitude thirty times or more larger than that of the powder core of the motor (FIG. 3C) which has ten poles and 12 slots, and has 24 cycles per rotation when there is no error in dimension or permeability. Likewise, the cogging torque associated with the combination of six poles with nine slots (FIG. 5B) essentially has a large cycle and a large amplitude, as is the case with FIG. 5A, and hardly presents a difference when there are errors in dimension and permeability and when a powder core is used. As a result, it is recognized that the cogging torque is affected by variations associated with the manufacturing only when the combination causes shortened cycles of the cogging torque.

The cycle of a main component of the cogging torque is determined by a least common multiple of the number of magnetic poles and the number of slots. Combinations which result in a shorter cycle of the cogging torque are as shown in FIG. 2, where the cogging torque tends to be affected by errors when it is generated 60 cycles or more per rotation, which results from a combination of ten poles with 12 slots.

Accordingly, a reduction in variations in dimensions, permeability and the like is effective when the least common multiple of the number of magnetic poles and the number of slots is 60 or more, stated another way, for combinations which result in 60 cycles or more of the main component of the cogging torque per rotation. Specifically, such combinations are eight magnetic poles of the rotor with nine slots of the stator; ten magnetic poles of the rotor with 12 slots of the stator; and 14 magnetic poles of the rotor with 12 slots of the stator.

While the foregoing embodiment has shown an example of an outer rotor type motor, similar effects can be produced as well in an inner rotor type motor which has a rotor inside.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A three-phase permanent magnet brushless motor comprising:
   a stator having three-phase windings; and
   a rotor having a permanent magnet with a plurality of poles for serving as a field magnet,
   wherein said stator comprises a stator core which includes a powder core that is compacted at a high density in at least teeth thereof, and
   a combination of the number of magnetic poles of said rotor with the number of slots of said stator satisfies a condition that a least common multiple of the number of slots and the number of magnetic poles is 60 or more in a region in which the number of magnetic poles is 16 or less, and the number of slots is 12 or less.

2. A three-phase permanent magnet brushless motor according to claim 1, wherein said powder core has a green density of 7.5 $g/cm^3$ or higher.

3. A three-phase permanent magnet brushless motor according to claim 1, wherein said powder core is compacted with a density error equal to or less than 5% of a magnetization property in at least the teeth of said stator, and a dimensional error restrained to 1/20 or less as long as a gap.

4. A three-phase permanent magnet brushless motor according to claim 1, wherein said combination of the number of poles of said rotor with the number of slots of said stator results in 60 cycles or more of a main component of a cogging torque per rotation.

* * * * *

UNITED STATES PATENT AND TRADEMARK OFFICE
CERTIFICATE OF CORRECTION

PATENT NO. : 7,592,734 B2
APPLICATION NO. : 11/505295
DATED : September 22, 2009
INVENTOR(S) : Enomoto et al.

It is certified that error appears in the above-identified patent and that said Letters Patent is hereby corrected as shown below:

Title page Item (73) Assignee should read: Hitachi Industrial Equipment Systems Co., Ltd., Tokyo (JP); Japan Servo Co., Ltd., Tokyo (JP) Hitachi Powdered Metals Co., Ltd., Chiba-ken (JP)

Signed and Sealed this

Twenty-fifth Day of May, 2010

David J. Kappos
*Director of the United States Patent and Trademark Office*